(12) United States Patent
Nakata

(10) Patent No.: US 8,807,591 B2
(45) Date of Patent: Aug. 19, 2014

(54) VEHICLE SEAT AND WEBBING SEWING METHOD

(71) Applicant: NHK Spring Co., Ltd., Yokohama (JP)

(72) Inventor: Shinichi Nakata, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 13/746,666

(22) Filed: Jan. 22, 2013

(65) Prior Publication Data

US 2013/0187416 A1 Jul. 25, 2013

(30) Foreign Application Priority Data

Jan. 25, 2012 (JP) ................................. 2012-013368

(51) Int. Cl.
*B60R 21/207* (2006.01)
*D05B 23/00* (2006.01)

(52) U.S. Cl.
CPC ....... *B60R 21/207* (2013.01); *B60R 2021/2076* (2013.01); *D05B 23/00* (2013.01)
USPC .................................... 280/728.3; 280/730.2

(58) Field of Classification Search
CPC ............. B60N 2/4235; B60N 2/42709; B60N 2/23138; B60N 2/207; B60R 21/2342
USPC ........................................... 280/728.3, 730.2
See application file for complete search history.

(56) References Cited

U.S. PATENT DOCUMENTS

| | | | |
|---|---|---|---|
| 6,237,934 B1 * | 5/2001 | Harrell et al. ............... | 280/728.3 |
| 7,222,876 B2 * | 5/2007 | Riesinger et al. .......... | 280/728.3 |
| 7,290,791 B2 * | 11/2007 | Tracht ......................... | 280/730.2 |
| 7,401,806 B2 * | 7/2008 | Tracht ......................... | 280/730.2 |
| 7,669,889 B1 * | 3/2010 | Gorman et al. ............. | 280/730.2 |
| 7,681,910 B2 * | 3/2010 | Wieczorek et al. ......... | 280/730.2 |
| 7,695,064 B2 * | 4/2010 | Thomas et al. ........... | 297/216.16 |

(Continued)

FOREIGN PATENT DOCUMENTS

| | | |
|---|---|---|
| DE | 102008030895 A1 | 3/2010 |
| JP | 2001-163164 A | 6/2001 |
| JP | 2001-513728 | 9/2001 |

(Continued)

OTHER PUBLICATIONS

Office Action issued Mar. 11, 2014 in corresponding Japanese Patent Application No. 2012-013368.
Office Action mailed Jun. 3, 2014 in corresponding Japanese Application No. 2012-013368.

*Primary Examiner* — James English
(74) *Attorney, Agent, or Firm* — Knobbe Martens Olson & Bear LLP

(57) ABSTRACT

A vehicle seat including: a side cover; a front cover; a side airbag module; and a webbing including a looped portion that is formed by a length direction middle portion of the webbing being folded into a loop and that sandwiches the sewn portion from both sides in the seat width direction, loop end portions at the both sides of the looped portion being sewn to the sewn portion, a weak portion being formed in the looped portion, one end side of the webbing being disposed at the seat width direction outer side relative to the side airbag when the side airbag is deployed, the other end side of the webbing being disposed at the seat width direction inner side relative to the deployed side airbag, and the webbing transferring deployment pressure received from the side airbag to the sewn portion and the weak portion as tension force.

5 Claims, 5 Drawing Sheets

(56) References Cited

U.S. PATENT DOCUMENTS

| | | | |
|---|---|---|---|
| 7,784,819 B2* | 8/2010 | Lawall et al. | 280/728.3 |
| 8,167,333 B2* | 5/2012 | Tracht et al. | 280/730.2 |
| 2006/0113761 A1* | 6/2006 | Tracht | 280/730.2 |
| 2006/0113764 A1* | 6/2006 | Tracht | 280/730.2 |
| 2006/0113767 A1* | 6/2006 | Tracht | 280/730.2 |
| 2006/0113768 A1* | 6/2006 | Tracht et al. | 280/730.2 |
| 2006/0113773 A1* | 6/2006 | Tracht | 280/730.2 |

FOREIGN PATENT DOCUMENTS

| | | |
|---|---|---|
| JP | 2002-166765 A | 6/2002 |
| JP | 2010-042719 A | 2/2010 |

* cited by examiner

VEHICLE SEAT AND WEBBING SEWING METHOD

CROSS-REFERENCE TO RELATED APPLICATION

This application is based on and claims priority under 35 USC 119 from Japanese Patent Application No. 2012-013368 filed on Jan. 25, 2012, the disclosure of which is incorporated by reference herein.

BACKGROUND

1. Technical Field

The present invention relates to a seat for a vehicle and a method of sewing a webbing.

2. Related Art

There is known a vehicle seat which is equipped with a side airbag device, which includes an airbag, and two webbings, which receive deployment pressure of the airbag and rupture a sewn portion between an end portion of a front face cover portion and an end portion of a side face cover portion (for example, Japanese Patent Application Laid-Open (JP-A) No. 2001-163164 and Japanese National Publication No. 2001-513728).

SUMMARY

However, for a vehicle seat like those disclosed in JP-A No. 2001-163164 and Japanese National Publication No. 2001-513728, end portions of the two webbings must be sewn to, respectively, the front face cover portion end portion and the side face cover portion end portion, and then the front face cover portion end portion and the side face cover portion end portion must be sewn together. Alternatively, vice versa, the front face cover portion end portion and the side face cover portion end portion must be sewn together and then the two webbing end portions sewn to, respectively, the front face cover portion end portion and the side face cover portion end portion. Therefore, sewing operations take time and effort.

In consideration of the situation described above, an object of the present invention is to reduce the time of an operation of sewing a webbing to a side cover and a front cover.

A first aspect of the present invention provides a vehicle seat including:

a side cover that covers a side portion of a seatback from a seat width direction outer side;

a front cover that covers the side portion from a seat front-and-rear direction front side and that is sewn to the side cover;

a side airbag module that is disposed inside the side portion and includes a side airbag that, when receiving a supply of gas, deploys toward a sewn portion of the side cover and the front cover; and a webbing including a looped portion that is formed by a length direction middle portion of the webbing being folded into a loop and that sandwiches the sewn portion from both sides in the seat width direction, loop end portions at the both sides of the looped portion being sewn to the sewn portion, a weak portion being formed in the looped portion, one end side of the webbing being disposed at the seat width direction outer side relative to the side airbag when the side airbag is deployed, the other end side of the webbing being disposed at the seat width direction inner side relative to the deployed side airbag, and the webbing transferring deployment pressure received from the side airbag to the sewn portion and the weak portion as tension force.

According to the vehicle seat of the first aspect of the present invention, when the side airbag receives the supply of gas and deploys toward the sewn portion of the side cover and front cover, the one end side and the other end side of the webbing are subjected to deployment pressure from the side airbag. This deployment pressure is transferred, in the form of tension forces, to the sewn portion of the side cover and front cover and the weak portion formed in the looped portion of the webbing. When the sewn portion is cleaved by this tension force and the weak portion is ruptured, the deployed side airbag is released to the vehicle front-and-rear direction forward side of the side portion of the seatback.

The looped portion is formed by the length direction middle portion of the webbing being folded into a loop, and in a state in which the looped portion sandwiches the sewn portion of the side cover and front cover from both sides in the seat width direction, the loop end portions at the two sides are sewn to the sewn portion. Because the sewn portion is sandwiched from both sides in the seat width direction in this manner by the looped portion formed at the length direction middle portion of the webbing, the loop end portions at both sides of the looped portion and the sewn portion may all be sewn together at one time. Therefore, compared with a case in which end portions of two webbings are separately sewn to a side cover and a front cover, the time of a sewing operation is reduced.

A second aspect of the present invention provides the vehicle seat according to the first aspect, wherein the loop end portions at the both sides are sewn to one another with the sewn portion interposed.

According to the vehicle seat of the second aspect of the present invention, the loop end portions at the two sides of the looped portion are sewn together with the sewn portion of the side cover and front cover interposed therebetween. Thus, compared with a case in which end portions of two webbings are separately sewn to a side cover and a front cover, the time of the sewing operation is reduced.

A third aspect of the present invention provides the vehicle seat according to the first aspect, wherein the weak portion comprises at least one of a penetrating hole or an incision formed in the looped portion.

According to the vehicle seat of the third aspect of the present invention, one or both of (a) penetrating hole(s) and (an) incision(s) is formed in the looped portion to serve as the weak portion. Therefore, when the webbing transfers the deployment pressure received from the side airbag to the looped portion, the looped portion ruptures starting from the penetrating hole(s) and/or incision(s), and the deployed side airbag is released to the seat front-and-rear direction forward side of the seatback side portion through the ruptured portion of the looped portion and the cleaved sewn portion of the side cover and front cover.

A fourth aspect of the present invention provides a method of sewing a webbing, the method including:

forming a looped portion by folding a length direction middle portion of a webbing, that includes a weak portion formed therein, into a loop;

sandwiching an end portion of a side cover and an end portion of a front cover from both sides with the looped portion; and sewing together loop end portions at the both sides of the looped portion, the end portion of the side cover and the end portion of the front cover.

According to the webbing sewing method of the fourth aspect of the present invention, the end portion of the side cover and the end portion of the front cover are sandwiched from both sides by the looped portion that is formed by the length direction middle portion of the webbing in which the weak portion is formed being folded into a loop. Hence, the loop end portions at both sides of the looped portion, the end portion of the side cover and the end portion of the front cover may all be sewn together at one time. Therefore, compared with a case in which end portions of two webbings are separately sewn to a side cover and a front cover, the time of a sewing operation is reduced.

A fifth aspect of the present invention provides a method of sewing a webbing, method including:

a sewing step, including sandwiching an end portion of a side cover and an end portion of a front cover from both sides with a looped portion that is formed by a length direction middle portion of a webbing being folded into a loop, and sewing together loop end portions at the both sides of the looped portion, the end portion of the side cover and the end portion of the front cover; and a cutting step, including cutting the looped portion.

According to the webbing sewing method of the fifth aspect of the present invention, first, in the sewing step, the end portion of the side cover and the end portion of the front cover are sandwiched from both sides by the looped portion, which is formed by the length direction middle portion of the webbing being folded into a loop, and the loop end portions at the two sides of the looped portion, the end portion of the side cover and the end portion of the front cover are sewn together. Then, in the cutting step, the looped portion is cut.

Because the end portion of the side cover and the end portion of the front cover are sandwiched from both sides by the looped portion of the webbing in this manner in the sewing step, the loop end portions at both sides of the looped portion, the end portion of the side cover and the end portion of the front cover may all be sewn together at one time. Therefore, compared with a case in which end portions of two webbings are separately sewn to a side cover and a front cover, the time of a sewing operation is reduced.

Moreover, because the looped portion of the webbing is cut in the cutting step, a deployed side airbag will be released to the seat front-and-rear direction forward side of a seatback through the cut portion of the looped portion and a cleaved sewn portion of the side cover end portion and the front cover end portion.

As described hereabove, according to the vehicle seat and webbing sewing method relating to the present invention, the time of an operation of sewing a webbing to a side cover and a front cover may be reduced.

BRIEF DESCRIPTION OF THE DRAWINGS

Exemplary embodiments of the present invention will be described in detail based on the following figures, wherein.

DETAILED DESCRIPTION

Figure 1:
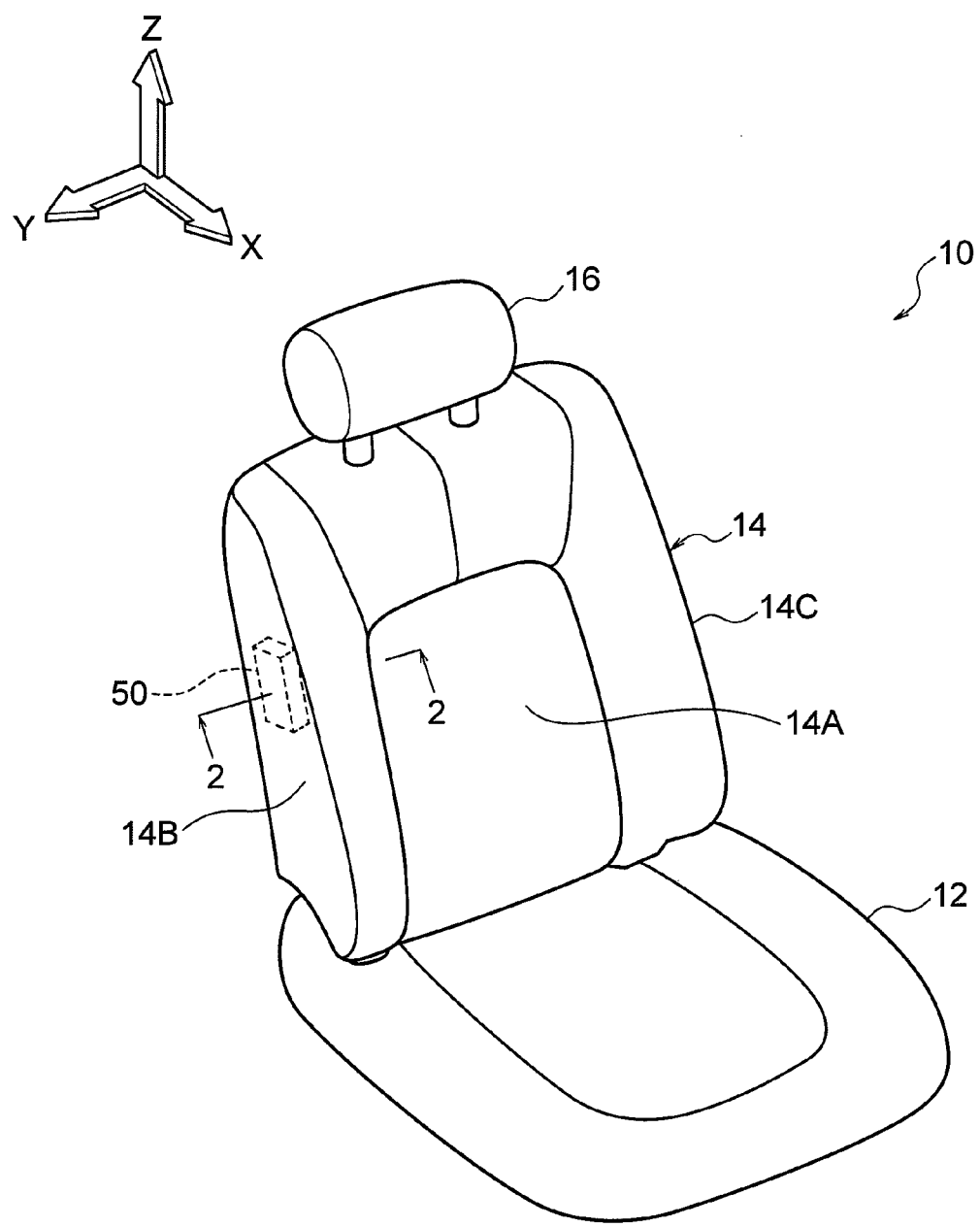
FIG. 1 is a perspective view showing a vehicle seat in accordance with an exemplary embodiment of the present invention.

Herebelow, a vehicle seat and webbing sewing method according to an exemplary embodiment of the present invention are described with reference to the drawings. An arrow X that is shown where suitable in the drawings indicates the forward side in a seat front-and-rear direction, an arrow Y indicates the outer side in a seat width direction, and an arrow Z indicates the upper side in a seat up-and-down direction.

FIG. 1 shows a vehicle seat 10 in accordance with the present exemplary embodiment. The vehicle seat 10 is, for example, a seat structuring a driver's seat, and is provided with a seat cushion 12 on which an occupant sits, a seatback 14, and a head rest 16. The seatback 14 is tiltably supported at a seat front-and-rear direction rear end portion of the seat cushion 12, and supports the back area of the occupant. The head rest 16 is provided at a seat up-and-down direction upper end portion of the seatback 14, and supports the head area of the occupant.

The seatback 14 is provided with a seatback main body portion 14A, an outer side side portion 14B and an inner side side portion 14C. The seatback main body portion 14A structures a seat width direction central portion of the seatback 14. The outer side side portion 14B is integrally provided at a seat width direction outer side end portion of the seatback main body portion 14A, and the inner side side portion 14C is integrally provided at a seat width direction inner side end portion of the seatback main body portion 14A. A vehicle side door, which is not shown in the drawings, is disposed at the seat width direction outer side of the outer side side portion 14B.

Figure 2:
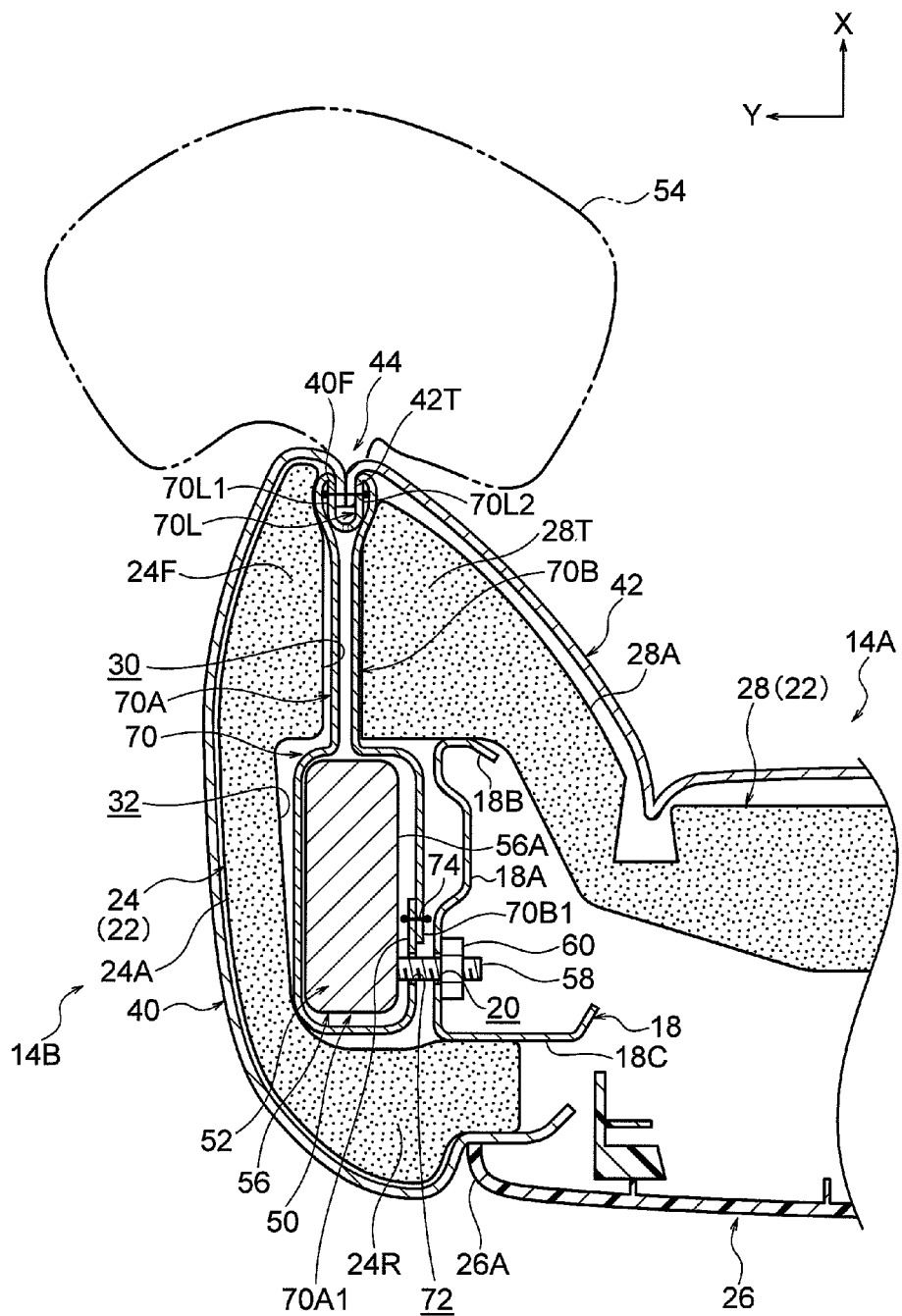
FIG. 2 is a sectional view cut along line 2-2 of FIG. 1.

As shown in FIG. 2, a seatback side frame 18 is provided inside the outer side side portion 14B, which serves as a side portion. The seatback side frame 18 extends in the seat up-and-down direction along the outer side side portion 14B. The seatback side frame 18 is formed substantially in a "C" shape in cross section, of which the seat width direction inner side is open. The seatback side frame 18 includes an outer side wall portion 18A along the seat front-and-rear direction, a front side wall portion 18B and a rear side wall portion 18C. The front side wall portion 18B is inflected to the seat width direction inner side from a seat front-and-rear direction front side portion of the outer side wall portion 18A, and the rear side wall portion 18C is inflected to the seat width direction inner side from a seat front-and-rear direction rear side portion of the outer side wall portion 18A.

Although not shown in the drawings, another seatback side frame is provided at the inner side side portion 14C of the seatback 14 (see FIG. 1) to form a pair with the seatback side frame 18. A seatback frame is structured by the pair of seatback side frames 18, a seat upper frame that joins upper end portions of the pair of seatback side frames 18 in the seat width direction, and the like.

A side airbag module 52 (which may hereinafter be referred to simply as "the airbag module") of a side airbag device 50, which is described below, is mounted to the outer side wall portion 18A of the seatback side frame 18. A seatback pad 22 formed of urethane foam or the like is disposed around the seatback side frame 18. The seatback pad 22 includes a pad side portion 24 and a pad front portion 28.

The pad side portion 24 is formed substantially in an "L" shape in cross section, and is disposed at the seat width direction outer side of the seatback side frame 18. An airbag module stowage portion 32 in which the airbag module 52 is stowed is formed between the pad side portion 24 and the seatback side frame 18. A seat front-and-rear direction rear end portion 24R of the pad side portion 24 wraps around the airbag module 52 from the seat width direction outer side to the seat front-and-rear direction rear side, and reaches the rear side wall portion 18C of the seatback side frame 18. An end portion 26A of a back cover trim 26 that structures a back face of the seatback 14 is superposed from the seat front-and-rear direction rear side on the rear end portion 24R of the pad side portion 24. A seat front-and-rear direction front side portion 24F of the pad side portion 24 is disposed at the seat front-and-rear direction front side relative to the airbag module 52.

The pad front portion 28 of the seatback pad 22 is disposed at the seat front-and-rear direction front side of the seatback side frame 18. The pad front portion 28 is provided from the outer side side portion 14B to the inner side side portion 14C (see FIG. 1). An outer side end portion 28T of the pad front portion 28, at the seat width direction outer side of the pad front portion 28, opposes the front side portion 24F of the pad side portion 24 at the seat front-and-rear direction front side of the airbag module 52. A release channel 30 is formed between the outer side end portion 28T of the pad front portion 28 and the front side portion 24F of the pad side portion 24. When a side airbag 54, which is described below, is deployed, the release channel 30 allows the side airbag 54 to be released to outside the seat.

An outer face 24A of the pad side portion 24 and an outer face 28A of the pad front portion 28 are covered by a side cover 40 and a front cover 42, respectively. The side cover 40 is disposed at the seat width direction outer side of the pad side portion 24. A seat front-and-rear direction front end portion 40F of the side cover 40 is inserted into the release channel 30 along the front side portion 24F of the pad side portion 24. The front cover 42 is disposed at the vehicle front-and-rear direction front side of the pad front portion 28. An outer side end portion 42T at a seat width direction outer side of the front cover 42 is inserted into the release channel 30 along the outer side end portion 28T of the pad front portion 28. At an exit vicinity of the release channel 30, the front end portion 40F of the side cover 40 and the outer side end portion 42T of the front cover 42 are both sewn together with loop end portions 70L1 and 70L2 of a looped portion 70L of a webbing 70, which is described below. Herebelow, portions of the front end portion 40F of the side cover 40 and the outer side end portion 42T of the front cover 42 that are sewn together are referred to as a sewn portion 44.

The side airbag device 50 is equipped with the airbag module 52 and the single webbing 70. The airbag module 52 includes an accommodation case 56, the side airbag 54, and an inflator. The side airbag 54 is accommodated in a folded state in the accommodation case 56. The inflator, which is not shown in the drawings, serves as a gas supplier that supplies gas to the side airbag 54. The airbag module 52 is stowed in the airbag module stowage portion 32. The side airbag 54 is formed in a bag shape of a cloth, a resin sheet or the like. The side airbag 54 is supplied with gas from the inflator and inflates while deploying. In FIG. 2, an outline of the side airbag 54 when deployed is shown by a two-dot chain line.

At an inner side face 56A at the seat width direction inner side of the accommodation case 56, stud bolts 58 that serve as joining members are provided. The stud bolts 58 protrude from the inner side face 56A of the accommodation case 56 toward the outer side wall portion 18A of the seatback side frame 18. Penetrating holes 20 are formed in the outer side wall portion 18A of the seatback side frame 18. The stud bolts 58 penetrate through the penetrating holes 20, and the airbag module 52 is joined to the outer side wall portion 18A of the seatback side frame 18 by the stud bolts 58 and nuts 60.

At least two of the stud bolts 58 are provided at the inner side face 56A of the accommodation case 56, spaced apart in the seat up-and-down direction. Correspondingly, at least two of the penetrating holes 20 through which the at least two stud bolts 58 respectively penetrate are formed in the outer side wall portion 18A of the seatback side frame 18, spaced apart in the seat up-and-down direction.

The webbing 70 is formed in a belt shape of a cloth, resin sheet or the like that is more resistant to extension than the side cover 40 and the front cover 42. In the present exemplary embodiment, the webbing 70 is formed of a material with about the same strength as the side airbag 54.

Two length direction end portions of the webbing 70 are sewn together. Thus, the webbing 70 is formed into a ring (a tube) which is open to both sides in the seat up-and-down direction. The airbag module 52 is disposed at an inner side of the webbing 70. At a length direction middle portion of the webbing 70, the looped portion 70L is formed, which is described below. The loop end portions 70L1 and 70L2 of the looped portion 70L are both sewn together with the front end portion 40F of the side cover 40 and the outer side end portion 42T of the front cover 42. Hereinafter, a portion of the webbing 70 at one end side relative to the looped portion 70L is described as an outer side sheet portion 70A, and a portion of the webbing 70 at the other end side relative to the looped portion 70L is described as an inner side sheet portion 70B.

The outer side sheet portion 70A of the webbing 70 extends to the seat front-and-rear direction rear side from the loop end portion 70L1 at the seat width direction outer side of the looped portion 70L, through the release channel 30 and between the pad side portion 24 and the airbag module 52. The outer side sheet portion 70A is folded round to the seat width direction inner side along a rear end portion of the airbag module 52. That is, the outer side sheet portion 70A of the webbing 70 is to be disposed at the seat width direction outer side relative to the side airbag 54 when the side airbag 54 is deployed.

An end portion 70A1 of the outer side sheet portion 70A (i.e., one end portion of the webbing 70) is wrapped around to between the inner side face 56A of the accommodation case 56 of the airbag module 52 and the outer side wall portion 18A of the seatback side frame 18. Penetrating holes 72 that penetrate through the outer side sheet portion 70A in the thickness direction thereof are formed in a portion of the outer side sheet portion 70A at the end portion 70A1 side thereof. The aforementioned stud bolts 58 of the airbag module 52 penetrate through these penetrating holes 72. Thus, the outer side sheet portion 70A of the webbing 70 is joined to the seatback side frame 18 via the stud bolts 58. That is, the outer side sheet portion 70A of the webbing 70 is also fastened to, i.e., jointed to, the outer side wall portion 18A of the seatback side frame 18 by the stud bolts 58.

At least two of the penetrating holes 72 through which the aforementioned at least two stud bolts 58 respectively penetrate are formed in the end portion 70A1 of the outer side sheet portion 70A, spaced apart in the seat up-and-down direction.

Meanwhile, the inner side sheet portion 70B of the webbing 70 extends from the loop end portion 70L2 at the seat width direction inner side of the looped portion 70L, through the release channel 30, to between the airbag module 52 and the seatback side frame 18. That is, the inner side sheet portion 70B of the webbing 70 is to be disposed at the seat width direction inner side relative to the deployed side airbag 54.

An end portion 70B1 of the inner side sheet portion 70B (i.e., the other end portion of the webbing 70) is sewn to the end portion 70A1 of the outer side sheet portion 70A of the webbing 70 at the seat front-and-rear direction front side of the stud bolts 58 of the airbag module 52, by a sewing thread 74.

Penetrating holes through which the stud bolts 58 of the airbag module 52 penetrate may be formed in the inner side sheet portion 70B, and the inner side sheet portion 70B may also be fastened to the outer side wall portion 18A of the seatback side frame 18 by the stud bolts 58.

Now, the structure of the looped portion 70L of the webbing 70 is described in detail.

Figure 3:
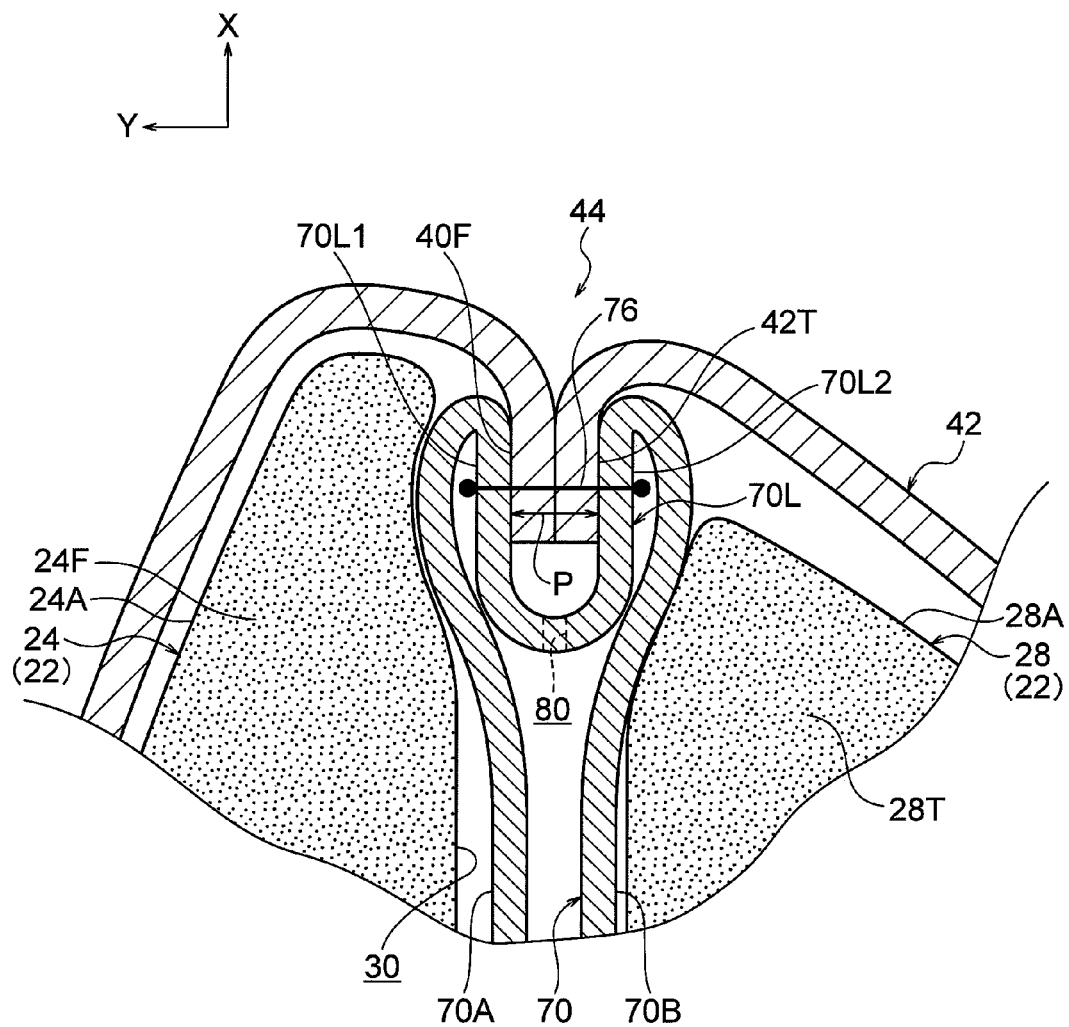
FIG. 3 is an enlarged view of FIG. 2.

As shown in FIG. 3, the looped portion 70L is formed by the length direction middle portion of the webbing 70 being folded, along a width direction of the webbing 70 (the seat up-and-down direction), into a loop. In a state of being superposed with one another, the front end portion 40F of the side cover 40 and the outer side end portion 42T of the front cover 42 are inserted to an inner side of the looped portion 70L. Thus, the outer side end portion 42T of the front cover 42 and the front end portion 40F of the side cover 40 are sandwiched from both sides in the seat width direction by the loop end portions 70L1 and 70L2 at the two sides of the looped portion 70L. In the state in which the loop end portions 70L1 and 70L2 of the looped portion 70L sandwich the outer side end portion 42T of the front cover 42 and the front end portion 40F of the side cover 40, the loop end portions 70L1 and 70L2 are sewn to one another by a sewing thread 76. That is, the loop end portions 70L1 and 70L2 of the looped portion 70L, the outer side end portion 42T of the front cover 42 and the front end portion 40F of the side cover 40 are all sewn together, and thus are sewn to one another.

The loop end portions 70L1 and 70L2 of the looped portion 70L, outer side end portion 42T of the front cover 42 and front end portion 40F of the side cover 40 may be sewn together by a variety of conventionally known sewing methods. The meaning of the term "loop end portions 70L1 and 70L2 of the looped portion 70L" as used herein includes portions of the looped portion 70L that are sewn to the outer side end portion 42T of the front cover 42 and the front end portion 40F of the side cover 40. The meaning of the term "length direction of the webbing 70" as used herein includes a direction that crosses a width direction of the webbing 70, which is along the seat up-and-down direction in the state in which the webbing 70 is mounted at the seatback 14, and does not necessarily mean a direction along a longest side of the webbing 70.

Figure 4:
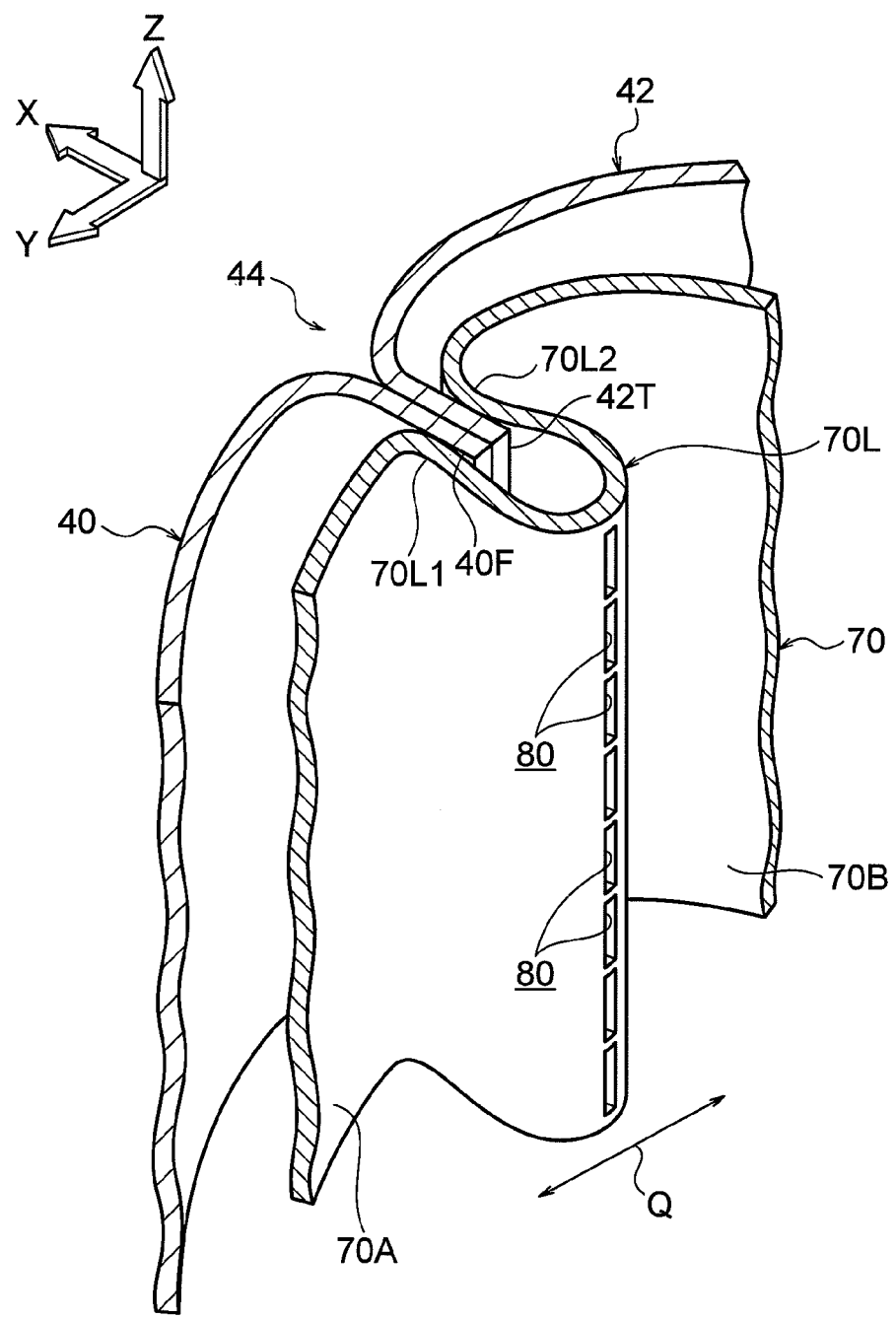
FIG. 4 is an enlarged perspective view showing a looped portion of a webbing that is shown in FIG. 2.

As shown in FIG. 4, plural penetrating holes 80 are formed in a length direction central portion of the looped portion 70L to serve as a weak portion. Note that the sewing thread 76 is not shown in FIG. 4. The plural penetrating holes 80 are formed to penetrate through the looped portion 70L in the thickness direction and are spaced apart in the width direction of the looped portion 70L. In the present exemplary embodiment, the plural penetrating holes 80 are disposed at the seat front-and-rear direction rear side of the sewn portion 44, and the plural penetrating holes 80 are arrayed in a straight line along the width direction of the looped portion 70L (the seat up-and-down direction). In other words, the plural penetrating holes 80 are formed as a perforation along the width direction of the looped portion 70L. Because of these penetrating holes 80, the looped portion 70L is more easily ruptured by a tension force Q in the length direction than other portions of the webbing 70 (the outer side sheet portion 70A and the inner side sheet portion 70B).

Next, an example of a method of assembling the side airbag device to the seatback side frame is described.

To start with, a method of sewing the looped portion 70L of the webbing 70 to the side cover 40 and the front cover 42 is described. First, as illustrated in FIG. 3, the outer face of the front end portion 40F of the side cover 40 and the outer face of the outer side end portion 42T of the front cover 42 are superposed. At this time, the front end portion 40F of the side cover 40 and the outer side end portion 42T of the front cover 42 may be provisionally held by tacking or the like. In this state, the length direction middle portion of the webbing 70, in which the plural penetrating holes 80 have been formed, is folded, along the width direction of the webbing 70 (the seat up-and-down direction), into a loop to form the looped portion 70L.

Next, one loop end portion 70L1 of the looped portion 70L is superposed with the inner face of the front end portion 40F of the side cover 40, and the other loop end portion 70L2 of the looped portion 70L is superposed with the inner face of the outer side end portion 42T of the front cover 42. Thus, the front end portion 40F of the side cover 40 and the outer side end portion 42T of the front cover 42 are sandwiched from both sides by the loop end portions 70L1 and 70L2. In this state, the loop end portions 70L1 and 70L2 of the looped portion 70L, the front end portion 40F of the side cover 40 and the outer side end portion 42T of the front cover 42 are all sewn together by the sewing thread 76. Thus, the loop end portions 70L1 and 70L2 of the looped portion 70L are sewn together with the front end portion 40F of the side cover 40 and the outer side end portion 42T of the front cover 42 interposed.

Then, the end portion 70A1 of the outer side sheet portion 70A of the webbing 70 and the end portion 70B1 of the inner side sheet portion 70B are sewn together by the sewing thread 74 (see FIG. 2). Thus, the webbing 70 is formed into a ring. As illustrated in FIG. 2, the outer side sheet portion 70A and inner side sheet portion 70B of the webbing 70 that are sewn together in this manner pass through the release channel 30 formed between the front side portion 24F of the pad side portion 24 and the outer side end portion 28T of the pad front portion 28 and are disposed inside the airbag module stowage portion 32, and the airbag module 52 is disposed at the inner side of the outer side sheet portion 70A and inner side sheet portion 70B.

Specifically, the rear end portion 24R of the pad side portion 24 is moved to the seat width direction outer side relative to the seatback side frame 18, the airbag module 52 is disposed in the airbag module stowage portion 32 through a gap between the rear end portion 24R of the pad side portion 24 and the seatback side frame 18, and the airbag module 52 is inserted to the inner side of the webbing 70. At this time, the stud bolts 58 of the airbag module 52 are caused to penetrate through the penetrating holes 72 formed in the outer side sheet portion 70A from the inner side of the webbing 70.

Next, while the airbag module 52 is being moved toward the seatback side frame 18 side, the stud bolts 58 of the airbag module 52 are caused to penetrate through the penetrating holes 20 formed in the outer side wall portion 18A of the seatback side frame 18. Then, the nuts 60 are fastened onto the stud bolts 58 from the seat width direction inner side of the seatback side frame 18. Thus, the airbag module 52 and the seatback side frame 18 are joined. Therefore, the outer side sheet portion 70A of the webbing 70 is also fastened to the outer side wall portion 18A of the seatback side frame 18, and the webbing 70 is joined (fixed) to the outer side wall portion 18A of the seatback side frame 18. Thereafter, the rear end portion 24R of the pad side portion 24 is moved back to the seatback side frame 18 side.

Next, operation of the vehicle seat according to the present exemplary embodiment is described.

According to the vehicle seat 10 in accordance with the present exemplary embodiment, when the inflator (not shown in the drawings) of the airbag module 52 activates at a time of collision of the vehicle or the like, gas is supplied to the interior of the side airbag 54, and the side airbag 54 deploys while inflating toward the release channel 30 through a front end portion of the airbag module 52.

When the side airbag 54 is deploying, the outer side sheet portion 70A and inner side sheet portion 70B of the webbing 70 are subjected to deployment pressure (inflation pressure) of the side airbag 54 and are stretched. As a result, the deployment pressure that the outer side sheet portion 70A and inner side sheet portion 70B receive from the side airbag 54 is transferred via the loop end portions 70L1 and 70L2 of the looped portion 70L to the sewn portion 44 between the front end portion 40F of the side cover 40 and the outer side end portion 42T of the front cover 42, in the form of a tension force P (see FIG. 3) that causes the sewn portion 44 to cleave open.

When the sewing thread 76 is broken and the sewn portion 44 is cleaved by the tension force P, the loop end portions 70L1 and 70L2 of the looped portion 70L move apart in the seat width direction and the looped portion 70L is opened out. Hence, the outer side sheet portion 70A and inner side sheet portion 70B of the webbing 70 transfer the deployment pressure received from the side airbag 54 to surrounding edge portions of the looped portion 70L that surround the penetrating holes 80, in the form of a tension force Q (see FIG. 4) that causes the looped portion 70L to rupture. When the looped portion 70L is ruptured by this tension force Q, starting from the penetrating holes 80, the side airbag 54 that is deployed as shown by the two-dot chain lines in FIG. 2 is released through the ruptured portion of the looped portion 70L and the cleaved sewn portion 44 to the vehicle front-and-rear direction front side of the outer side side portion 14B. Thus, the side airbag 54 is released to between an occupant sitting on the vehicle seat 10 and the vehicle side door, which is not shown in the drawings.

Herein, in the aforementioned state in which the looped portion 70L sandwiches the sewn portion 44 of the front end portion 40F of the side cover 40 and the outer side end portion 42T of the front cover 42 from both sides in the seat width direction, the loop end portions 70L1 and 70L2 at the two sides are sewn to one another. Therefore, compared to a structure in which end portions of two webbings are separately sewn to the front end portion 40F of the side cover 40 and the outer side end portion 42T of the front cover 42, the time of an operation of sewing the webbing 70 to the sewn portion 44 is reduced.

Moreover, the plural penetrating holes 80 are formed in the looped portion 70L to be spaced apart in the width direction of the webbing 70. By suitable modification of the spacing of the penetrating holes 80 and the shapes and sizes of the penetrating holes 80, the looped portion 70L may be caused to rupture when a tension force Q that is at or above a predetermined value acts on the looped portion 70L.

Next, variant examples of the vehicle seat and webbing sewing method according to the exemplary embodiment described above are described.

Figure 5:
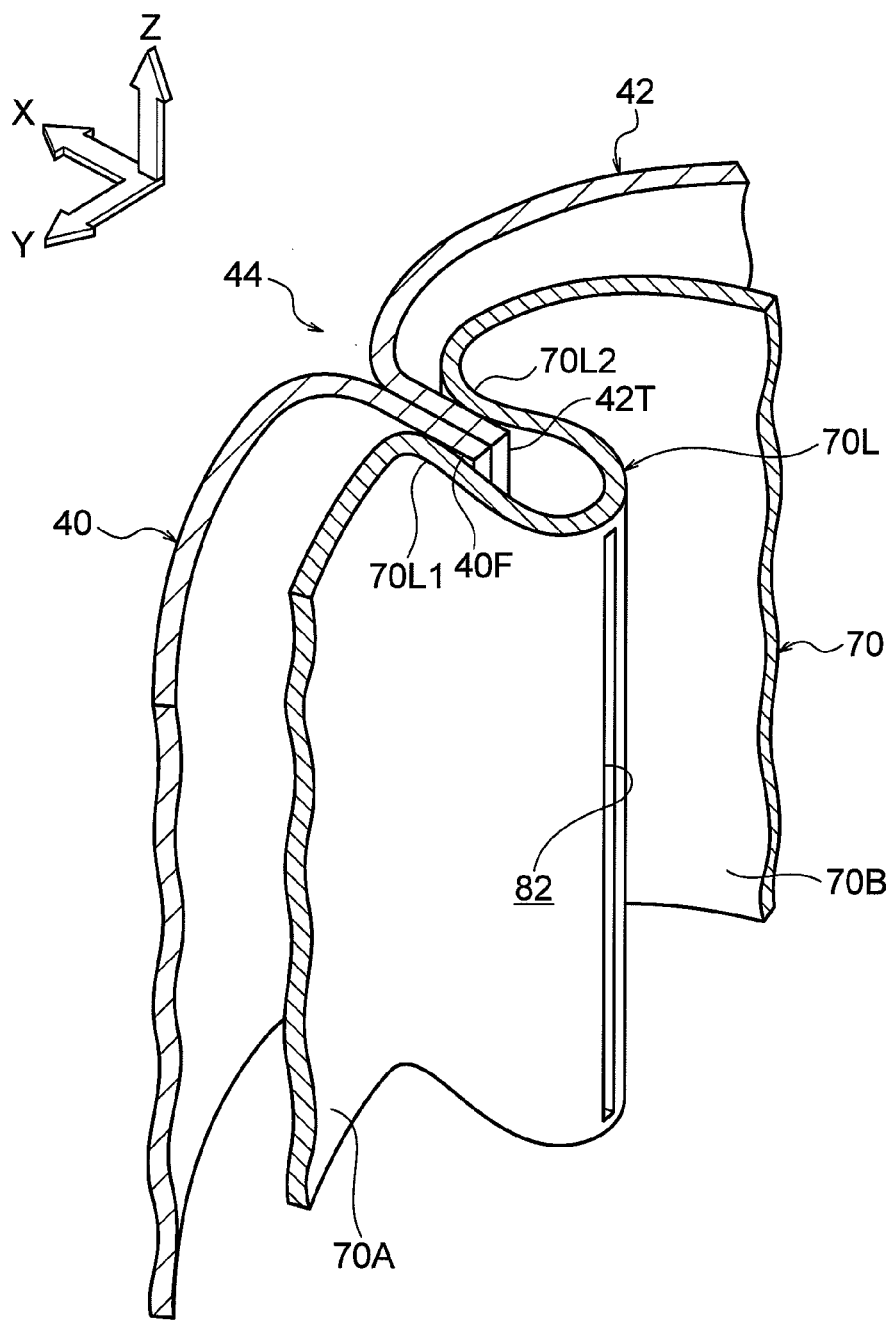
FIG. 5 is an enlarged perspective view, corresponding to FIG. 4, showing a variant example of a weak portion of the exemplary embodiment of the present invention.

In the above exemplary embodiment, the plural penetrating holes 80 are formed in the looped portion 70L to serve as the weak portion, but this is not limiting. However, for example, as shown in FIG. 5, a single penetrating hole 82 with a long hole shape may be formed in the looped portion 70L from the lower end side to the upper end side thereof.

The weak portion is not limited to penetrating holes. For example, incisions (slits) may be formed at width direction end portions of the looped portion 70L. Furthermore, the looped portion 70L may be formed with a suitable combination of penetrating hole(s) and incision(s). That is, one or both of penetrating holes and incisions may be formed in the looped portion 70L to serve as the weak portion.

In the above exemplary embodiment, the penetrating holes 80 are formed in the length direction central portion of the looped portion 70L to serve as the weak portion but this is not limiting. It is sufficient that the penetrating holes 80 and incisions serving as the weak portion be formed between the loop end portions 70L1 and 70L2 of the looped portion 70L, and positions thereof may be modified as appropriate.

In the above exemplary embodiment, the looped portion 70L in which the plural penetrating holes 80 are formed to serve as the weak portion is sewn to the front end portion 40F of the side cover 40 and the outer side end portion 42T of the front cover 42. However, the looped portion 70L may be sewn to the sewn portion 44 and then cut.

As a specific example, in a sewing step, the length direction middle portion of the webbing 70, in which the weak portion that is the penetrating holes 80 or the like is not formed, is folded into the loop to form the looped portion, the front end portion 40F of the side cover 40 and the outer side end portion 42T of the front cover 42 are sandwiched from both sides by the looped portion, and the loop end portions at the two sides of the looped portion are sewn to the front end portion 40F of the side cover 40 and the outer side end portion 42T of the front cover 42. Then, in a cutting step, a predetermined portion of the looped portion between the loop end portions is cut, and the looped portion is divided.

In this sewing step, the loop end portions at the two sides of the looped portion, the front end portion 40F of the side cover 40 and the outer side end portion 42T of the front cover 42 are all sewn together. Therefore, as the same as in the exemplary embodiment described above, the time of the operation of sewing the webbing 70 to the sewn portion 44 may be reduced compared to a structure in which the end portions of two webbings are separately sewn to the front end portion 40F of the side cover 40 and the outer side end portion 42T of the front cover 42.

Because the looped portion is cut in the cutting step, the deployed side airbag 54 is released to the seat front-and-rear direction forward side of the outer side side portion 14B of the seatback 14 through the cut portion of the looped portion and the cleaved sewn portion 44 between the front end portion 40F of the side cover 40 and the outer side end portion 42T of the front cover 42. Therefore, the same operations and effects as in the exemplary embodiment described above may be provided.

In the above exemplary embodiment, the end portion 70A1 of the outer side sheet portion 70A and end portion 70B1 of the inner side sheet portion 70B of the webbing 70 are sewn together, but this is not limiting. It is sufficient if the outer side sheet portion 70A of the webbing 70 is disposed at the seat width direction outer side relative to the deployed side airbag 54, and the end portion 70A1 side of the outer side sheet portion 70A is fixed to the airbag module 52, the seatback frame including the seatback side frame 18 or the like so as to be able to transfer deployment pressure received from the side airbag 54 to the sewn portion 44 and the looped portion 70L. Similarly, it is sufficient if the inner side sheet portion 70B of the webbing 70 is disposed at the seat width direction inner side relative to the deployed side airbag 54, and the end portion 70B1 side of the inner side sheet portion 70B is fixed to the airbag module 52, the seatback frame including the seatback side frame 18 or the like so as to be able to transfer deployment pressure received from the side airbag 54 to the sewn portion 44 and looped portion 70L as a tension force.

While an exemplary embodiment of the present invention has been described hereabove, the present invention is not to be limited to this exemplary embodiment. It will be obvious to those skilled in the art that the exemplary embodiment and various variant examples may be used in appropriate combinations, and that the present invention can be embodied in numerous modes within a scope not departing from the spirit of the invention.

What is claimed is:

1. A vehicle seat comprising:
   a side cover that covers a side portion of a seatback from a seat width direction outer side;
   a front cover that covers the side portion from a seat front-and-rear direction front side and that is sewn to the side cover;
   a side airbag module that is disposed inside the side portion and includes a side airbag that, when receiving a supply of gas, deploys toward a sewn portion of the side cover and the front cover; and
   a single webbing including a looped portion that is formed by folding a length direction middle portion of the webbing toward an inside of the seat and into a recessed loop, wherein the looped portion sandwiches the sewn portion from both sides in a seat width direction, loop end portions at the both sides of the looped portion being sewn to one another and to the sewn portion, and a weak portion being formed in the looped portion, one end side of the webbing being disposed at the seat width direction outer side relative to the side airbag when the side airbag is deployed, another end side of the webbing being disposed at a seat width direction inner side relative to the side airbag when deployed, and the webbing transferring deployment pressure received from the side airbag to the sewn portion and the weak portion as tension force.

2. The vehicle seat according to claim 1, wherein the loop end portions at the both sides are sewn to one another with the sewn portion interposed.

3. The vehicle seat according to claim 1, wherein the weak portion comprises at least one of a penetrating hole or an incision formed in the looped portion.

4. A method of sewing the webbing according to claim 1, the method comprising:
   forming the looped portion by folding a length direction middle portion of the webbing, that includes a weak portion formed therein, into a loop;
   sandwiching an end portion of the side cover and an end portion of the front cover from both sides with the looped portion; and
   sewing together loop end portions at the both sides of the looped portion, the end portion of the side cover and the end portion of the front cover.

5. A method of sewing the webbing according to claim 1, the method comprising:
   sandwiching an end portion of the side cover and an end portion of the front cover from both sides with looped portion that is formed by a length direction middle portion of the webbing being folded into a loop;
   sewing together loop end portions at the both sides of the looped portion, the end portion of the side cover and the end portion of the front cover; and
   cutting the looped portion.

* * * * *

UNITED STATES PATENT AND TRADEMARK OFFICE
CERTIFICATE OF CORRECTION

PATENT NO. : 8,807,591 B2
APPLICATION NO. : 13/746666
DATED : August 19, 2014
INVENTOR(S) : Shinichi Nakata It is certified that error appears in the above-identified patent and that said Letters Patent is hereby corrected as shown below:

IN THE CLAIMS

In column 12, line 9, in Claim 4, change "a" to --the--.

In column 12, line 10, in Claim 4, change "a" to --the--.

In column 12, line 10, in Claim 4, change "a loop;" to --the recessed loop;--.

In column 12, line 16, in Claim 4, change "loop" to --the loop--.

In column 12, line 22, in Claim 5, change "with" to --with the--.

In column 12, line 23, in Claim 5, change "a" to --the--.

In column 12, line 24, in Claim 5, change "a loop;" to --the recessed loop;--.

In column 12, line 25, In Claim 5, change "loop" to --the loop--.

Signed and Sealed this
Twenty-third Day of June, 2015

Michelle K. Lee
*Director of the United States Patent and Trademark Office*